US007014157B2

(12) United States Patent  
Oddsen

(10) Patent No.: US 7,014,157 B2  
(45) Date of Patent: Mar. 21, 2006

(54) FRICTION CYLINDER FOR A SUPPORT DEVICE

(75) Inventor: Odd N. Oddsen, Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 106 days.

(21) Appl. No.: 10/286,563

(22) Filed: Oct. 31, 2002

(65) Prior Publication Data

US 2004/0084587 A1    May 6, 2004

(51) Int. Cl.  
*E04G 3/00*    (2006.01)

(52) U.S. Cl. .............................. 248/280.11; 248/284.1; 248/648; 188/322.22

(58) Field of Classification Search .............. 248/284.1, 248/280.11, 278.1, 648, 281.11, 123.11, 292.11, 248/297.1, 631; 267/286, 288, 284, 280, 267/188, 294, 312, 64.18, 64.15; 188/322.15, 188/322.22

See application file for complete search history.

(56) References Cited

U.S. PATENT DOCUMENTS

| 1,141,279 | A |   | 6/1915  | Smith |
| 2,552,074 | A |   | 5/1951  | Thompson |
| 4,166,602 | A |   | 9/1979  | Nilsen et al. |
| 4,650,145 | A |   | 3/1987  | Natzel |
| 4,826,123 | A | * | 5/1989  | Hannah et al. ............. 248/248 |
| 5,123,621 | A |   | 6/1992  | Gates |
| 5,279,488 | A |   | 1/1994  | Fleming |
| 5,579,874 | A | * | 12/1996 | Jeffries et al. ........... 188/282.9 |
| 5,738,316 | A |   | 4/1998  | Sweere et al. |
| 5,743,503 | A |   | 4/1998  | Voeller et al. |
| 5,799,917 | A |   | 9/1998  | Li |
| 5,826,846 | A |   | 10/1998 | Buccieri et al. |
| 5,842,672 | A |   | 12/1998 | Sweere et al. |
| 5,876,008 | A |   | 3/1999  | Sweere et al. |
| 5,918,841 | A |   | 7/1999  | Sweere et al. |
| 5,924,665 | A |   | 7/1999  | Sweere et al. |

(Continued)

FOREIGN PATENT DOCUMENTS

EP    0185229 A1 *  11/1985

(Continued)

*Primary Examiner*—Gwendolyn Baxter  
(74) *Attorney, Agent, or Firm*—Lerner, David, Littenberg, Krumholz & Mentlik, LLP

(57) ABSTRACT

A positionable support device includes a friction cylinder as a counterbalance in place of conventional gas springs. The support device includes a support arm pivotally secured between two endcaps to allow for vertical movement, the first endcap being mounted to a support structure such as a wall or desktop, the second endcap adapted to engage a mounting element for a device such as an electronic device. A friction cylinder is pivotally attached at one end to the first endcap, and at the other to an outward portion of the support arm. The friction cylinder includes a tubular member open at one end for receiving a friction bushing and a shaft. The friction bushing is secured to the tubular member and has a central passage which allows the shaft to slide through the friction bushing, extending and retracting in relation to the tubular member. The friction bushing is adjusted to apply frictional resistance to movement of the shaft sufficient to support the weight of the support device and the electronic device, thereby allowing the device to be adjusted to a desired vertical position.

9 Claims, 7 Drawing Sheets

U.S. PATENT DOCUMENTS

| | | |
|---|---|---|
| 5,967,479 A | 10/1999 | Sweere et al. |
| 5,975,472 A | 11/1999 | Hung |
| 5,992,809 A | 11/1999 | Sweere et al. |
| 6,012,693 A | 1/2000 | Voeller et al. |
| 6,015,120 A | 1/2000 | Sweere et al. |
| 6,076,785 A | 6/2000 | Oddsen, Jr. |
| 6,394,402 B1 | 5/2002 | Coonan et al. |
| 6,394,403 B1 | 5/2002 | Hung |
| 6,460,839 B1 * | 10/2002 | Muller ........................ 267/221 |

FOREIGN PATENT DOCUMENTS

| EP | 1331431 A2 * | 7/2003 |
|---|---|---|

* cited by examiner

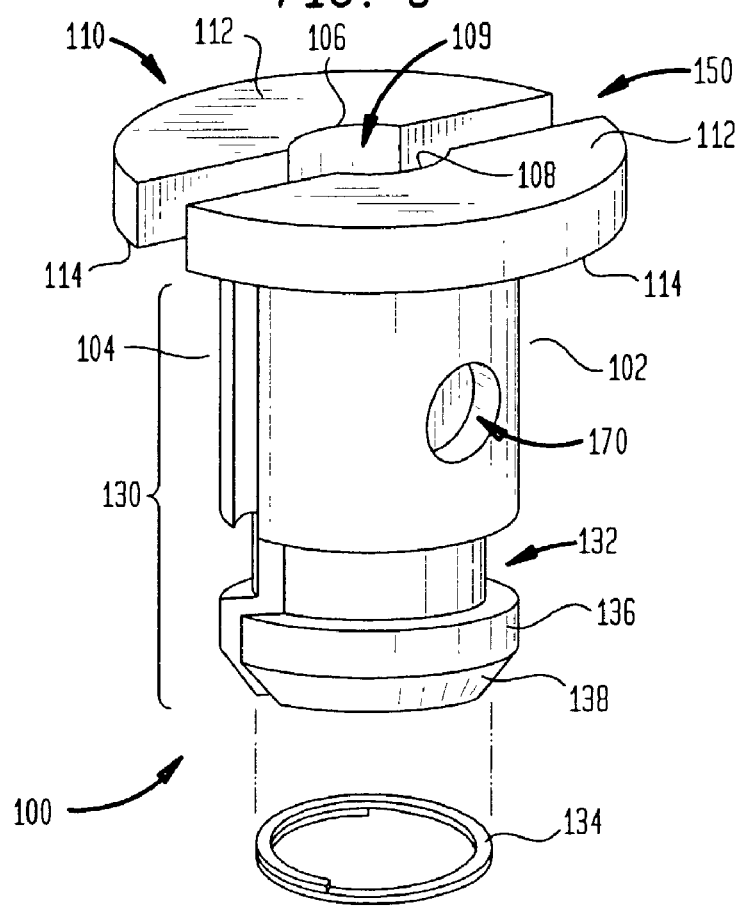
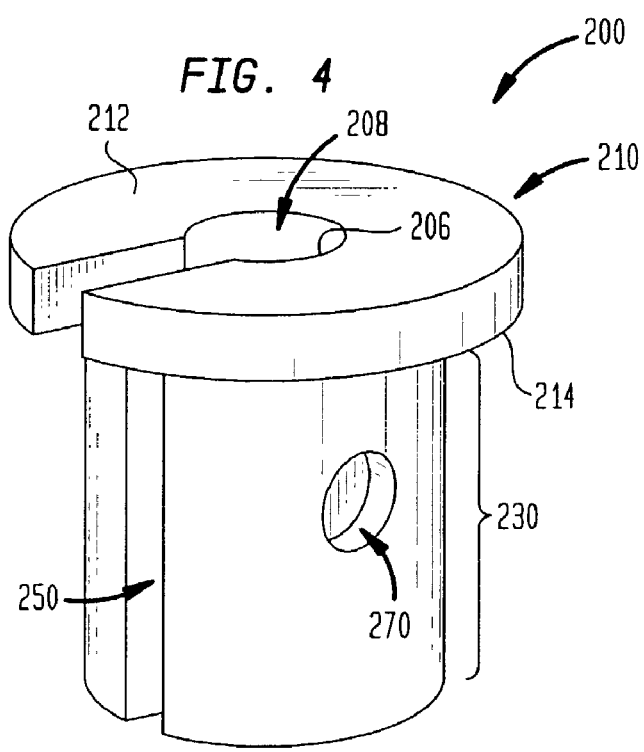

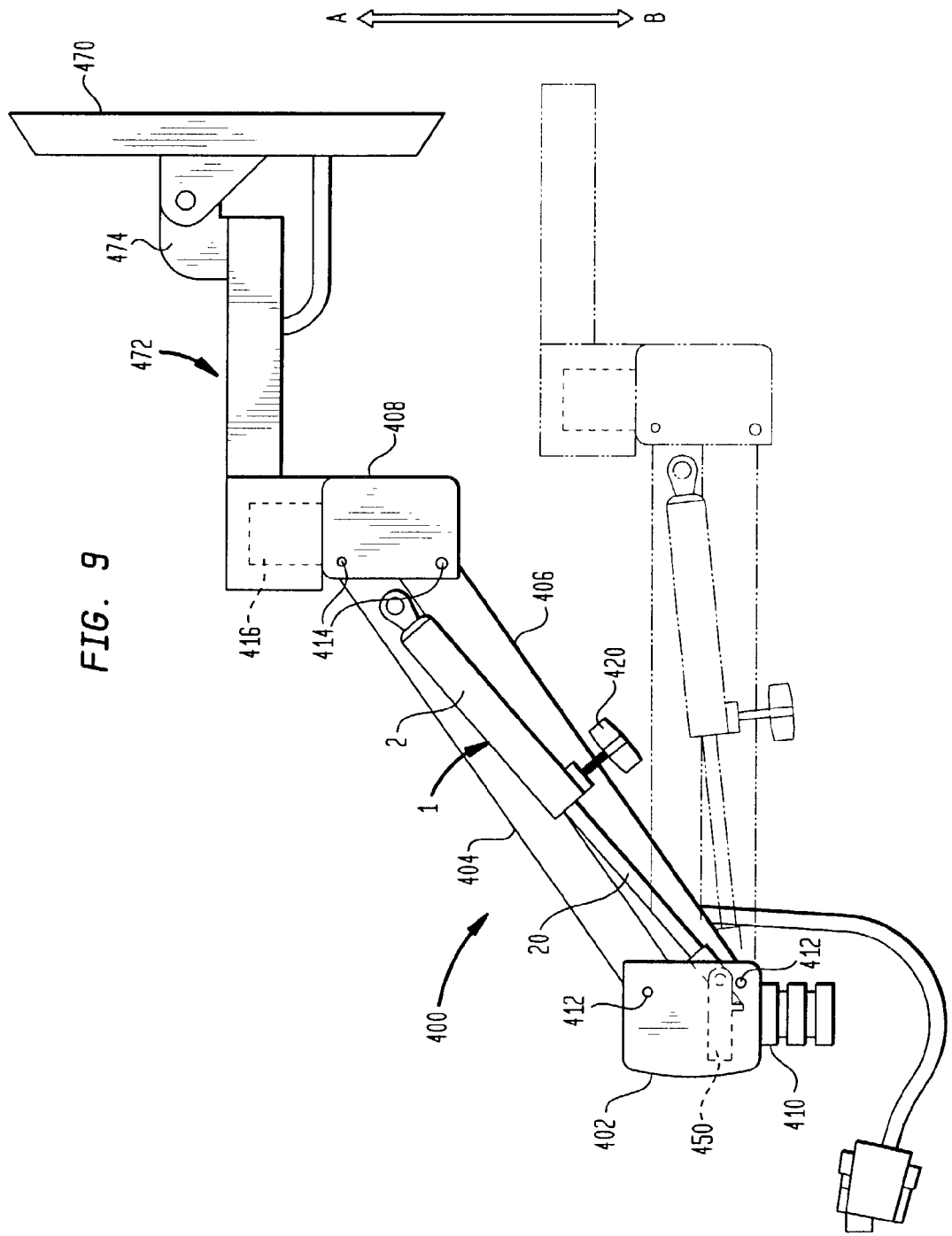

FRICTION CYLINDER FOR A SUPPORT DEVICE

BACKGROUND OF THE INVENTION

The invention relates generally to the field of support devices, and more particularly, pertains to support arms for electronic devices, such as a computer monitor, flat screen display, television, or keyboard which are adjustable to a variety of positions and have a counterbalance to support the weight of the electronic device.

Positionable support arms for mounting electronic peripheral devices, such as computer monitors or televisions to, among other things, a wall, column, ceiling, desktop or other support structure are well known in the prior art. Conventional support arms include a rigid elongated arm having a first end pivotally coupled to the support structure for pivoting movement about a generally horizontal first pivot axis and vertically between and upper and lower position. A mounting element is provided for coupling a device to a second end of the rigid arm, which typically provides for pivoting of the device about a second generally horizontal pivot point, and vertically to maintain the orientation of the device as the arm is moved between upper and lower positions.

Some conventional support arm systems rely on frictional contact between moving parts of the rigid arm to hold a device in the desired position relative to the support structure. Such systems require that the frictional forces overcome the force of gravity acting on the support arm and the associated device. For example the arm may include a frictional assembly at a pivot point including at least two planar surfaces where a nut, bolt and spring washer assembly provide tension to the assembly.

Other conventional support arms of the prior art include conventional springs, gas springs, also referred to as gas cylinders or pneumatic cylinders, or other biasing means to counterbalance at least a portion of the weight supported by the support arm. See, for example, U.S. Pat. No. 6,409,134 to Oddsen, Jr., commonly assigned, which describes an extension arm for mounting an electronic peripheral device which utilizes a gas spring. Similarly, U.S. Pat. No. 6,076,785 to Oddsen, Jr., also commonly assigned, describes an adjustable keyboard support which is maintained in position by a pneumatic cylinder. Both of these references are incorporated herein by reference.

For further illustration, FIG. 1 is a drawing of an assembled support arm 500 for mounting a peripheral device in accordance with the prior art. As depicted, the main elements of the support arm 500 are a first endcap 502, an upper channel 504, a lower channel 506, a second endcap 508, and a gas spring 510. The first endcap 502 has an endcap shaft 512 that is pivotally attachable to a rigid support mount (not shown), such as an orifice sized to accept the endcap shaft 512 or a track configured and sized to engage the grooves on endcap shaft 512. The rigid support mount is in turn secured to a support structure (not shown). The first endcap 512 is pivotally coupled via pins 514 to both the upper channel 504 and lower channel 506. The opposite ends of upper channel 504 and lower channel 506 are pivotally coupled via pins 516 to the second endcap 508. The second endcap is coupled to a mounting element (not shown) for holding a device (not shown) such as an electronic peripheral device. The combination of the upper and the lower channels 504,506 and the first and the second endcaps 502,508 form an adjustable parallelogram that permits a device coupled to the mounting element to be raised and lowered to a desired height. The parallelogram retains its position by employing a gas spring 510 which is pivotally and adjustably attached to the first endcap 502 and an outward portion of the upper channel 504 as further described below. Thus, the gas spring 510 causes the parallelogram to retain its position when the only force exerted on the support arm 500 is the weight of the support arm coupled with the weight of the supported device, but permits the parallelogram to be adjusted when a user applies downward or upward force to the endcap 508.

One end of the gas spring 510 is attached to an outward portion of upper channel 504 as shown. A hole disposed at one end of the upper channel has a threaded ball stud 534 placed within the hole and secured by a nut 536. The ball stud 534 is adapted to receive one end of the gas spring 510 via attachment 538 to form a ball and socket joint.

Disposed within the first endcap 502 is a threaded rod 518 which is inserted in a hole (not shown) at the base of endcap 502, and secured in place by a clip 520. The clip is fastened to an inner surface of the first endcap 502 by screws 522. Threadedly mounted on the threaded rod 518 is a clevis 522 threaded through a centrally located tapped hole (not shown). At a first end of the clevis 522 is a pair of fastening members 524 to which are fastened one end of the gas spring 510 by attachment 526. A second end of the clevis 522 is configured to slidably engage a track 528 which is integrally molded in the first endcap 502. A first end 530 of the threaded rod 518 is configured to be engaged by a hex-shaped key (not shown) which is inserted through hole 532 at the top of endcap 502 when first end 530 of the threaded rod 518 is properly aligned with hole 532. The hex-shaped key is employed so as to rotate the threaded rod 518. When the threaded rod 518 is rotated, the clevis moves along the length of the threaded rod in a direction corresponding to the direction the key is tuned. This movement of the clevis permits the gas spring to be adjusted.

Support arms employing gas springs, such as the one shown in FIG. 1 and others like it, are considerably more expensive than support arms which rely upon frictional resistance as a basis for maintaining the position of the arm and supporting the weight of the device. They typically require an adjustment mechanism such as that described above, which means they are more costly to manufacture and difficult to assemble. Further, gas springs tend produce a bouncing movement when they are moved, which is particularly undesirable when the support arm is used in connection with a support for a keyboard, wherein the typing produces repeated downward motion but the user desires the keyboard to remain in a fixed position. Friction based devices, on the other hand, are often limited in the amount of weight they can support, and are typically difficult to adjust. Ordinarily, friction based supports are locked in a fixed position. Moreover, such devices tend to be unreliable, and are thus not as desirable for use with expensive and delicate electronic equipment.

Accordingly, notwithstanding the existence of support arms including a gas spring, there is a need for a reliable friction-based support arm that is easy to assemble and adjust, and that is less expensive to manufacture than conventional support arms including a gas spring.

SUMMARY OF THE INVENTION

The general purpose of the present invention is to provide an adjustable support device including a support arm and a friction cylinder counterbalance.

According to one embodiment of the present invention, there is provided a friction cylinder having a hollow tubular member with first and second ends, and an elongated shaft or rod slidably received within the tubular member through an opening at a first end of the tubular member. A friction bushing is coupled to the first end of the tubular member to frictionally engage the shaft to create frictional resistance to the sliding movement of the shaft within the cylinder.

In one embodiment, the friction bushing is a fully-split friction bushing. That is, it has mating halves which when aligned form the friction bushing. Each mated half has a central longitudinal groove whereby, when the two halves are in alignment, they form a central longitudinal passage adapted to receive the shaft or rod. When pressure is applied to the friction bushing through a regulating element, the surfaces of the grooves frictionally engage the shaft providing resistance to movement of the shaft. When the friction bushing is connected within a support device, it is the frictional resistance to movement of the arm that creates a counterbalance to the weight of at least a portion of the support device and its device.

In yet another embodiment, the friction bushing is a half-split friction bushing. That is, the friction bushing is composed of a single body portion as opposed to two halves as described with respect to a fully-split friction bushing. The body portion has a longitudinal gap that runs radially to a central groove and passage defined thereby. The central longitudinal passage is adapted to slidably receive a shaft or rod. The gap allows pressure applied to the body by a regulating element to close the body about the shaft. Thus, the surfaces of the groove engage the shaft, thereby generating frictional resistance to extension or retraction of the shaft with respect to the friction bushing.

In preferred embodiments of the friction bushings described above, the friction bushing has a head portion and a body portion. In the case of the fully-split friction bushing, the head and body portions are defined when the two mating halves are in alignment. The body portion is adapted to be received within the tubular member of a friction cylinder, while the head portion is larger in diameter than the opening of the tubular member in at least one direction to create a stop to movement of the friction bushing in the direction of the tubular member.

In preferred embodiments, the friction bushing will also include a follower bushing disposed within the tubular member at one end of the shaft or rod The follower bushing will secure the rod in a central position within the tubular member to facilitate smooth movement of the shaft. The follower bushing may also act as a stop to prevent the shaft from extending completely free of the tubular member.

It is contemplated that the friction cylinders described above be used in connection with a support device. Accordingly, in one embodiment of the invention, the friction cylinders will include an attachment at a second end of the shaft, and another attachment at a second end of the tubular member for securing the friction cylinder within a support device.

One embodiment of an adjustable support device of the present invention includes a first and second endcap, an elongated, rigid support arm, and a friction cylinder as a counterbalance. The first endcap may be mounted to a support structure, such as a wall, ceiling, stand base, desktop or the like. The elongated support am has first and second ends, the first end of which is pivotally connected to the first endcap so that the support arm may move in a generally vertical direction. Pivotally connected to the second end of the support arm is the second endcap. A forearm extension is connected to the second endcap for securing an electronic device. The friction cylinder is connected by attachments at a first end to the first endcap, and at a second end to an outward portion of the support arm as a counterbalance to the weight of at least a portion of the support device and its associated device.

Additional objects, features, and advantages of the friction cylinder according to the present invention will become apparent to those skilled in the art upon consideration of the following detailed description of embodiments illustrated in the drawings.

BRIEF DESCRIPTION OF THE DRAWINGS

The accompanying drawings, which are incorporated in and form a part of the specification, illustrate the embodiments of the present invention and, together with the description, serve to explain the principles of the invention.

FIG. 3 is a perspective view of a fully-split friction bushing according to the present invention.

FIG. 4 is a perspective view of a half-split friction bushing according to the present invention.

FIG. 9 is a side view of an assembled support device with an interior friction cylinder shown in association with a peripheral device in upper and lower positions

DETAILED DESCRIPTION

In describing the preferred embodiments of the subject matter illustrated and to be described with respect to the drawings, specific terminology will be resorted to for the sake of clarity. However, the invention is not intended to be limited to specific terms so selected, and it is to be understood that each specific term includes all technical equivalents which operate in a similar manner to accomplish a similar purpose.

Figure 2:
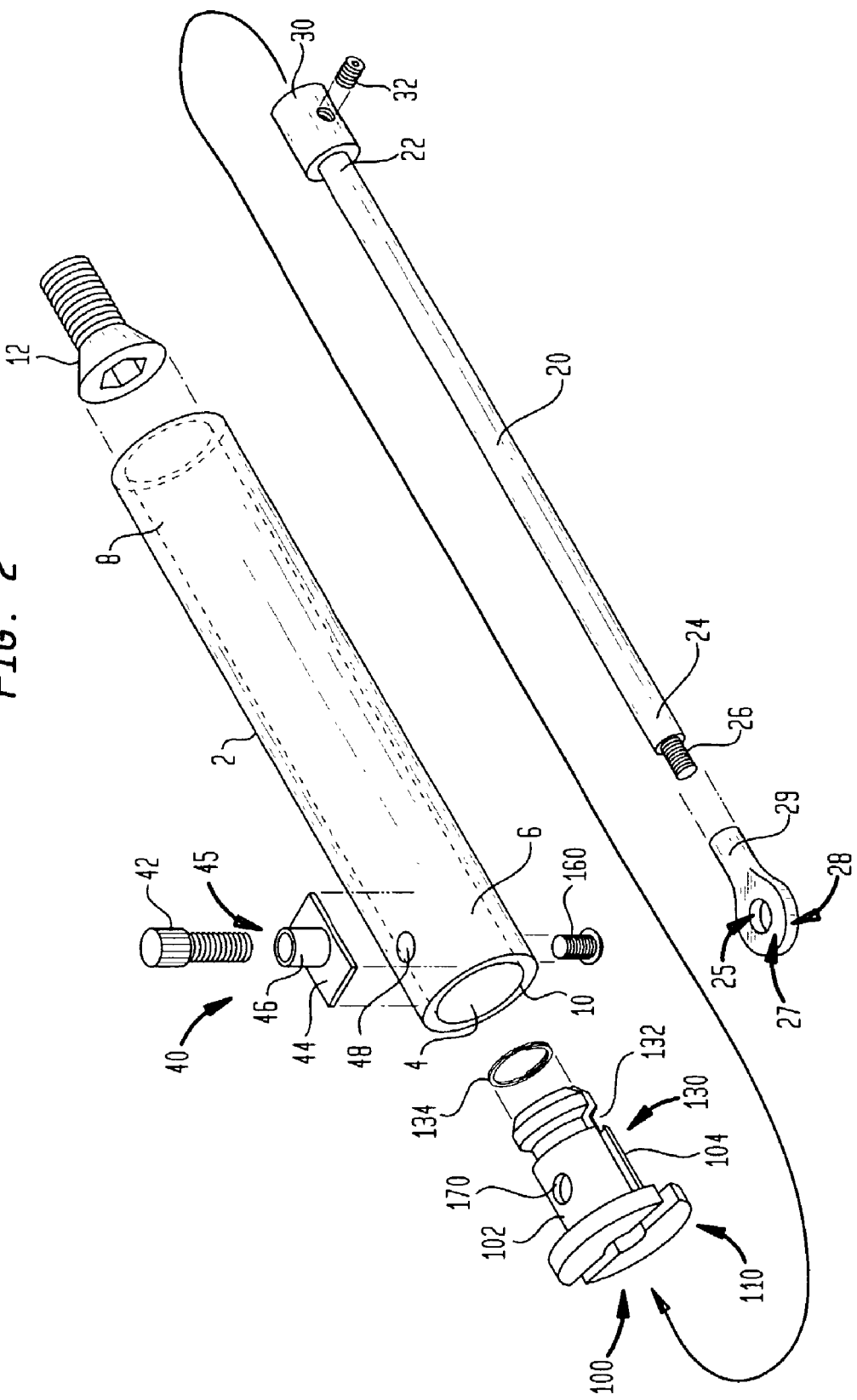
FIG. 2 is an unassembled exploded view of a friction cylinder according to the present invention.

Referring now to the drawings, wherein like reference numerals represent like elements, there is disclosed in FIG. 2 an exploded view of a friction cylinder of the present invention. The friction cylinder includes an elongated hollow tubular member 2 having an opening 4 defined by the walls of tubular member 2 at a first end 6. A friction bushing 100 is received by opening 4 at the first end 6 of tubular member 2, the friction bushing 100 being adapted to slidably receive a shaft or rod 20. The friction bushing 100 may be tightened about the shaft 20 by turning cap screw 42 to provide a desired degree of frictional resistance to movement of the shaft 20 for the purpose of supporting a device when the friction cylinder is used in connection with a support device.

The friction bushing 100 of FIG. 2 is shown as a fully-split friction bushing, which is depicted in more detail in the perspective view of FIG. 3. Mated halves 102 and 104 form a roughly circular head region 110 having a diameter greater than that of opening 4 of tubular member 2 (FIG. 2). The head region 10 is shown having an upper surface 112, and a lower surface 114, the lower surface 114 forming a circular lip which engages the circular edge 10 of first end 6 of tubular member 2 (FIG. 2), thereby creating a stop to inward movement of the friction bushing 100 with respect to tubular member 2. Head region 110 is of a thickness to resist the forces applied to the lip, and is preferably circular to match the shape of tubular member 2. The head region 110, however, may be of any number of shapes. For example, in one embodiment, upper surface 112 formed by two mated halves 102, 104 may be convex.

Extending from head region 110, also defined by mated semi-circular halves 102 and 104, is a cylindrical portion 130 having a diameter less than that of opening 4 of tubular member 2 (FIG. 2) Such that friction bushing 100 may be recieved within opening 4 of tubular member 2. An annular groove 132 located towards the end of cylindrical portion 130 is adapted to receive expandable key ring 134 which when fitted over annular cylindrical portion 136 and into groove 132 serves to secure and align the mated halves 102 and 104 Tapered end 138 of cylindrical portion 130 facilitates expansion of the key ring 134 over annular portion 136 and into groove 132, in addition to insertion of the friction bushing 100 into opening 4 of tubular member 2.

Each mated half 102 and 104 has a longitudinal semi-circular groove 106 and 108 which, when the two halves are in alignment, forms a centered longitudinal passage 109 through the friction bushing to Slidably receive shaft 20. A gap 150 remains between the two mated halves 102 and 104 so that the two halves may be tightened about shaft 20, thereby creating frictional resistance to the movement of shaft 20.

Referring back to FIG. 2, one half 104 of friction bushing 100 is secured to the first end 6 of tubular member 2 by a button head screw 160, or other suitable fastener, which passes through an opening in the wall of tubular member 2 (not shown) and is rotationally received by a threaded opening (not shown) in one half 104 of friction bushing 100. The friction bushing 100 is secured so that it does not become dislodged from the tubular member 2 when shaft 20 extends and retracts in relation to tubular member 2 and the shaft 20 is frictionally engaged by the friction bushing 100. Other means of securing the bushing, for example, by a suitable adhesive, clip, or pin may be used in the alternative or in addition to screw 160. As previously stated, the lip created by head region 10 of bushing 100 also assists in securing the bushing within tubular member 2. In some embodiments of the present invention, head region 110 of bushing 100 may be unnecessary and omitted in light of alternative fasteners or securing methods. Although preferable, it is also not necessary that the friction bushing be located at the very end of tubular member 2, so long as there is sufficient distance provided for movement of shaft 20 without the shaft sliding completely free of the friction bushing 100.

Frictional resistance is adjusted by a regulating element 40 shown including a cap screw 42. A nut 45 is preferably welded, or otherwise affixed, to the wall of tubular member 2 by a flattened base portion 44. Extending upward from base portion 44 away from tubular member 2 is a threaded element 46 for receiving cap screw 42. An opening 48 in the wall of tubular member 2 below the base portion 44 permits passage of the end of cap screw 42. The walls defining opening 48 may also be threaded. When friction bushing 100 is secured within tubular member 2, the opening 48 in the wall of tubular member 2 is aligned with a depression 170 located on cylindrical portion 130 of half 102 of friction bushing 100 such that the end of cap screw 42 fits within depression 170 and engages the friction bushing 100. Rotational movement of cap screw 42 in a clockwise motion tightens the friction bushing about shaft 20, thereby increasing frictional resistance to movement of the shaft 20. The end of cap screw 42 does not come into direct contact with shaft 20, instead, tightening cap screw 42 exerts inward pressure upon half 102 of friction bushing 100, which engages shaft 20 along the surface of longitudinal grooves 106, 108 of passage 109 of the friction bushing 100. Because there is more surface area in contact with the shalt along grooves 106,108, as opposed to merely the tip of cap screw 42, greater frictional resistance is created, allowing the friction cylinder to act as a sufficient counterbalance to the device when the friction cylinder is used in connection with a support device.

A follower bushing 30 may be attached to the first end 22 of shaft 20. The follower bushing is cylindrical, having a diameter only slightly less than that of the opening of tubular member 2 such that the follower bushing, when attached to shaft 20, may move freely within tubular member 2. Central to the follower bushing is a longitudinal bore (FIG. 5) slightly larger than the diameter of shaft 20, for attaching shaft 20 to the follower bushing 30. A set screw 32 secures shaft 20 within the bore of the follower bushing 30. Follower bushing 30 serves to maintain alignment of shaft 20 in a central position within tubular member 2. Depending upon the length and material properties of shaft 20, by maintaining the shaft parallel to the walls of tubular member 2, the follower bushing will prevent distortion of shaft 20. Also, by maintaining the central, parallel position of the shaft in relation to the walls of tubular member 2 serves to maintain smooth movement of shaft 20 as the shaft extends and retracts with respect to tubular member 2. Additionally, follower bushing 30 acts as a stop, preventing shaft 20 from becoming dislodged from friction bushing 100. Preferably, the follower bushing is constructed of metal, more preferably brass.

A number of variations of the friction bushing 100 may be used in accordance with the present invention. Another example of a friction bushing of the present invention is shown in FIG. 4. A half-split bushing 200, similar to the fully-split bushing 100 (FIG. 3), has a roughly circular head region 210 having a diameter greater than that of opening 4 of tubular member 2 (FIG. 2), an upper surface 212, and a lower surface 214 forming a circular lip which engages edge 10 of the first end 6 of tubular member 2 (FIG. 2), thereby creating a stop to inward movement of the friction bushing 200 with respect to tubular member 2. Head region 210 is of a thickness to resist the forces applied to the lip, and is preferably circular to match the shape of tubular member 2.

Extending from head region 210 is a roughly cylindrical portion 230 having a diameter less than that of opening 4 of tubular member 2 (FIG. 2) such that friction bushing 200 may be received within opening 4 of tubular member 2. A centrally positioned longitudinal groove 206 defines a centered longitudinal passage 208 through the friction bushing 200 to slidably receive shaft 20. A longitudinal wedge-shaped gap 250 provides for tightening and loosening of the friction bushing 200 about shaft 20, thereby adjusting frictional resistance to the movement of shaft 20. Adjustment of the frictional resistance is achieved by turning a cap screw 42 (FIG. 2), of regulating element 40, which is received by friction bushing 200 in depression 270. As the half-split friction bushing shown is constructed of a single piece, there is no need for a key ring and annular groove as shown in association with the fully-split version.

Figure 5:
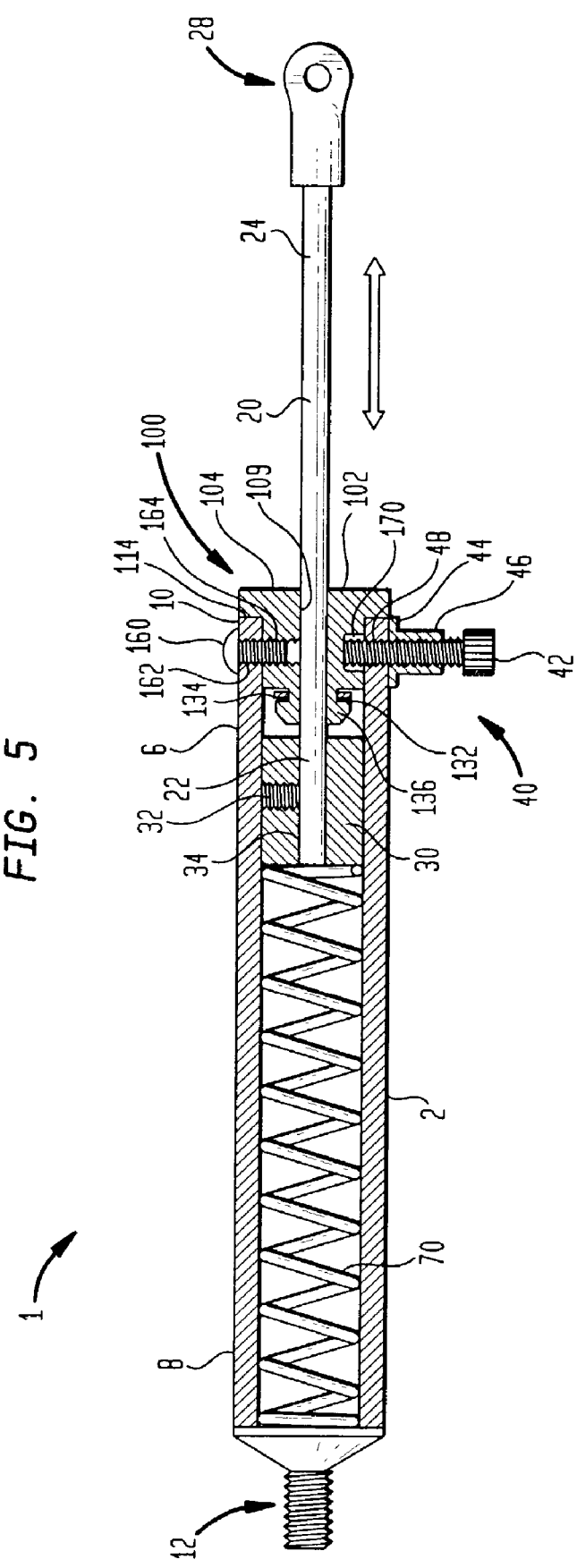
FIG. 5 is a side view in partial cross section of an assembled friction cylinder according to the present invention.

An assembled friction cylinder 1 in accordance with the present invention is shown in FIG. 5. The tubular member 2, having first and second ends 6,8 is adapted to receive a friction bushing 100 through an opening 4 at a first end 6. The friction bushing 100 is in turn adapted to slidably receive a shaft 20, shown here in an extended position. The friction cylinder 1 is adapted to be secured within a support device 400 (FIG. 6), being connected within the device by attachment 28, at a second end 24 of shaft 20, and also connected by attachment 12 at second end 8 of tubular member 2. Attachment of the friction cylinder within a support device is discussed in more detail with respect to FIG. 5, below.

Figure 1:
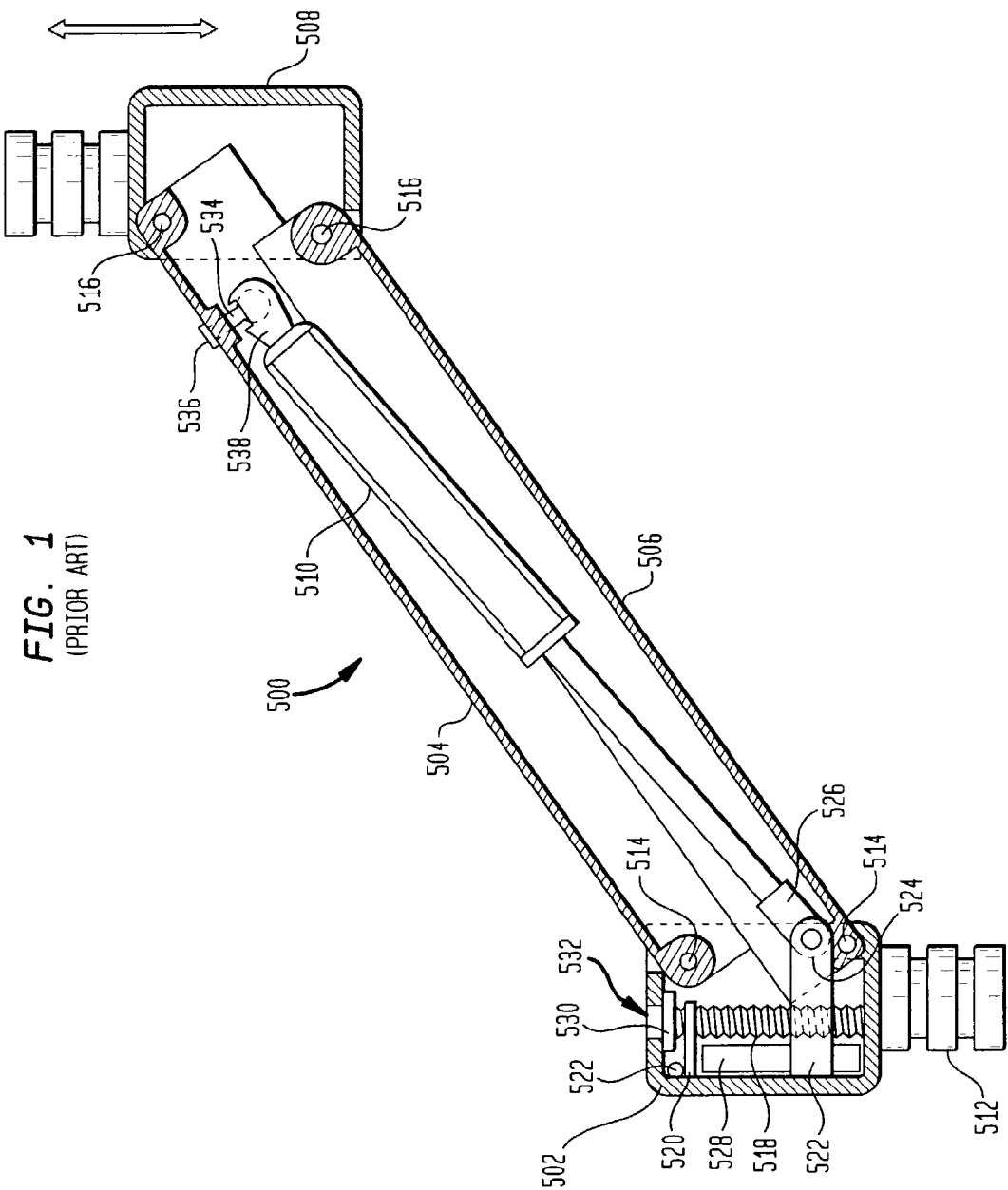
FIG. 1 is a side view in partial cross section of an assembled prior art support device including a gas cylinder.

Referring again to FIG. 5, the friction bushing 100 is preferably secured to the first end 6 of tubular member 2 by a button head screw 160, which passes through an aperature 162 in the wall of tubular member 2 and is received in a threaded aperature 164 disposed in the second half 104 of the fully-split friction bushing 100. Alternatively, or in addition to aperature 164, aperature 162 in the wall of tubular member 2 may be threaded to receive screw 160. Also securing the friction bushing 100, is a lip defined by the lower surface 114 of head portion 110 of friction bushily 100, where the lip engages edge 10 at the first end 6 of tubular member 2, thereby forming a stop to the inward movement of friction bushing 100. The first and second halves 102, 104 of friction bushing 100 are held in alignment by key ring 134, which is fitted over tapered end 138 and annular portion 136 into annular groove 132. In the embodiment illustrated in FIG. 5, the annular portion 136 does not have the same diameter as the remainder of cylindrical portion 130 as shown in the embodiment depicted in FIGS. 1 and 2.

Friction bushing 100 is a fully-split friction bushing having two halves 102, 104. Longitudinal grooves 106,108 (FIG. 3) form a longitudinal passage 109 when the two halves 102,104 are aligned, the longitudinal passage 109 adapted to slidably receive shaft 20. At a first end of shaft 20 is a follower bushing 30 which serves to insure the shaft is properly aligned within tubular member 2 as the shaft 20 moves between an extended and retracted position, and also serves as a stop preventing shaft 20 from being dislodged from friction bushing 100 by overextension. The follower bushing is cylindrical, having a diameter less than that of the opening 4 of tubular member 2, and attaches to the end of shaft 20 by a central passage 34, secured by setscrew 32.

The friction bushing 100 can be tightened or loosened about shaft 20 by a friction regulating element 40 including cap screw 42. Cap screw 42 is rotationally received by a nut 44,46 attached, and preferably welded, to the outer wall of tubular member 2 at a first end 6, passing through an aperature 48 in the wall of tubular member 2, and received by a depression 170 in a first half 102 of friction bushing 100. Turning the cap screw 42 in one direction moves the screw to assert radial pressure upon the friction bushing, thus increasing pressure upon shaft 20 and increasing frictional resistance to movement of shaft 20 along longitudinal passage 109.

Figure 6:
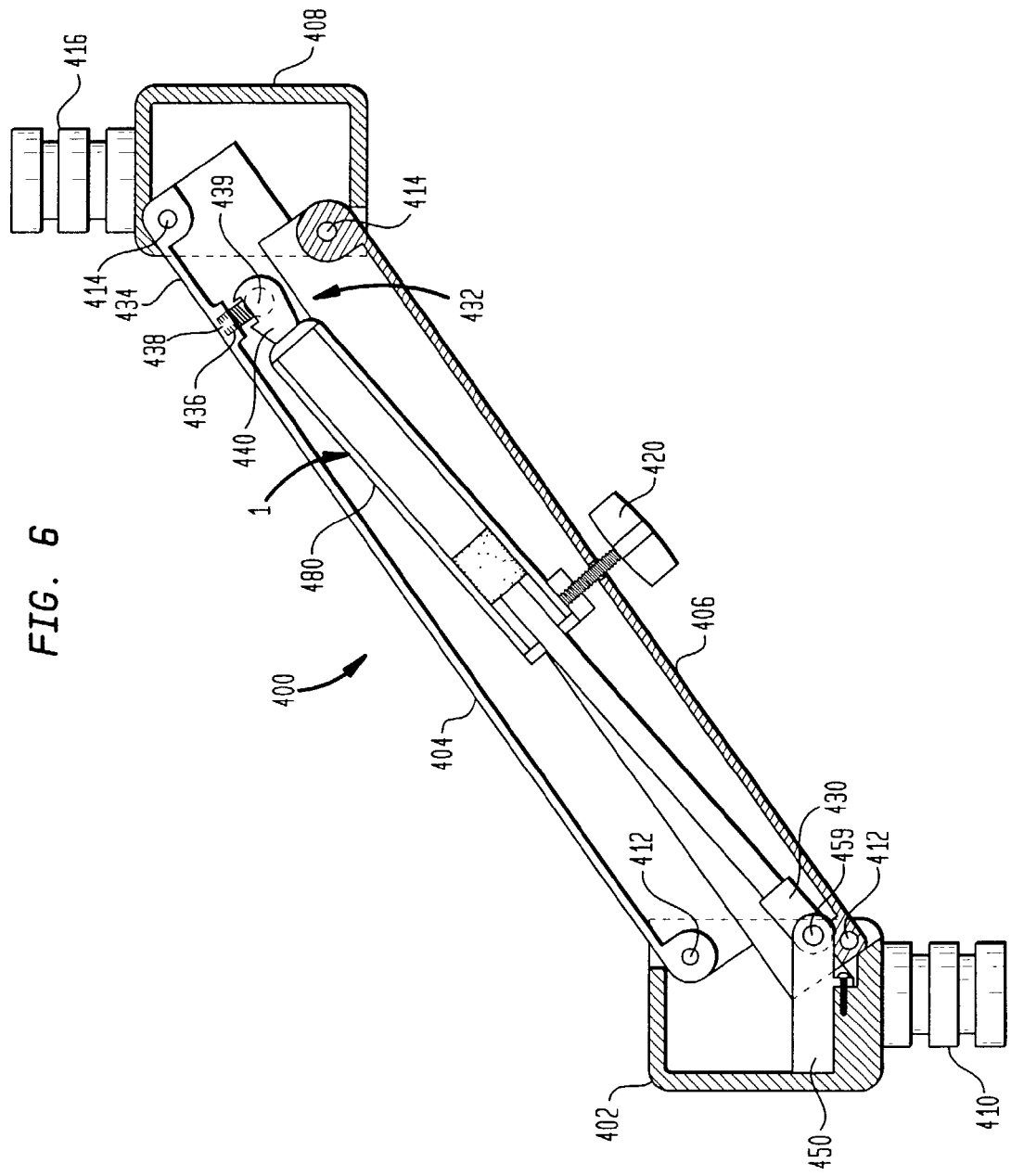
FIG. 6 is a side view in partial cross section of an assembled support device incorporating a friction cylinder according to the present invention.

Embodiments of the friction cylinder exemplified by the above detailed description are suitable for use with a variety of support devices, particularly those including an extension arm as depicted in one embodiment shown in FIG. 6. Such extension arms, utilizing gas springs for support, have been previously described in U.S. Pat. No. 6,409,134 to Oddsen, Jr., commonly assigned, which describes an extension arm for mounting a flat-screen electronic peripheral device which utilizes a gas spring. Another example is U.S. Pat. No. 6,076,785 to Oddsen, Jr., also commonly assigned, which describes an adjustable keyboard support which is maintained in position by a pneumatic cylinder. Both of these references are hereby incorporated by reference.

Support device 400 is an extension arm suitable for mounting an electronic device such as a computer monitor or television according to one embodiment of the invention. The main elements of the extension arm are a first end cap 402, an upper channel 404, a lower channel 406, a second end cap 408, and a friction cylinder 1. The end caps may also be referred to in the prior art as endpieces.

The first end cap has an end cap shaft 410 that is pivotally attachable to a rigid support mount (not shown), such as an orifice sized to accept the end cap shaft 410 or a track configured and sized to engage the grooves on end cap shaft 410. The first end cap 402 is pivotally coupled via pins 412 to both the upper channel 404 and lower channel 406. The opposite ends of the upper channel 14 and the lower channel 16 are pivotally coupled via pins 414 to the second end cap 408. The second end cap 408 has a shaft 416 adapted to engage a mounting element (not shown) for mounting a peripheral electronic device. The combination of the upper and lower channels 404,406 and the first and second end caps 402,408 form an adjustable parallelogram that permits a device coupled to the mounting element (not shown) to be raised and lowered to a desired height. The parallelogram retains its position by employing a friction cylinder 1 of the current invention, which is pivotally attached to the first end cap 402 and the upper channel 404, as will be further described below. The friction cylinder's length changes when upward or downward force is exerted at the second end cap 408 that exceeds the frictional resistance setting of the friction cylinder 1 as adjusted by the friction regulating element, shown here using a tension adjustment screw 420. Thus, the friction cylinder causes the parallelogram to retain its position when the only force exerted at the second end cap is the weight of the device and its supported device, but permits the parallelogram to be adjusted when a user pushes or pulls the support device 400 up or down. The lower channel 406 has central longitudinal open channel (not shown) which allows for movement of the tension screw 420 as the support device moves between an upper and lower position.

With respect to support device 400, the support arm includes two elongated elements, upper channel 404 and lower channel 406. In conventional support devices, the support arm may be formed from of a single elongated member. In those instances, the friction cylinder may not be enclosed within a portion of the support arm as it is shown in support device 400 with respect to upper and lower channels 404, 406. Here, the lower channel 406 provides additional stability and strength to the support device 400, as well as improving the appearance of the device by concealing the friction cylinder 1. While the upper and lower channel configuration is preferred, it is contemplated that one or multiple elongated members may be utilized to form a support arm suitable for use with a friction cylinder of the present invention.

Figure 7:
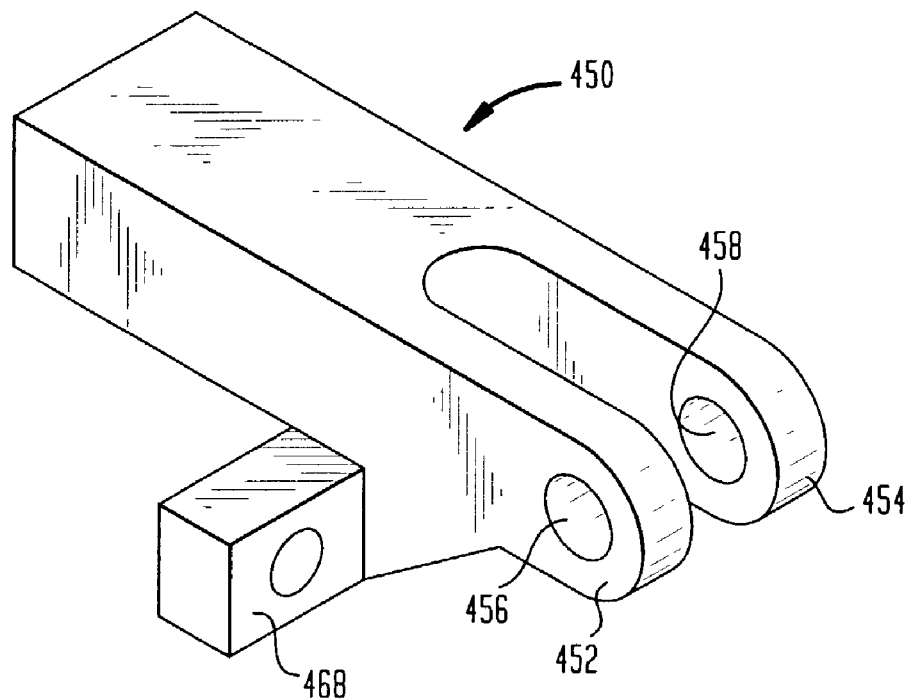
FIG. 7 is a perspective view of a nonadjustable clevis according to the present invention.
Figure 8:
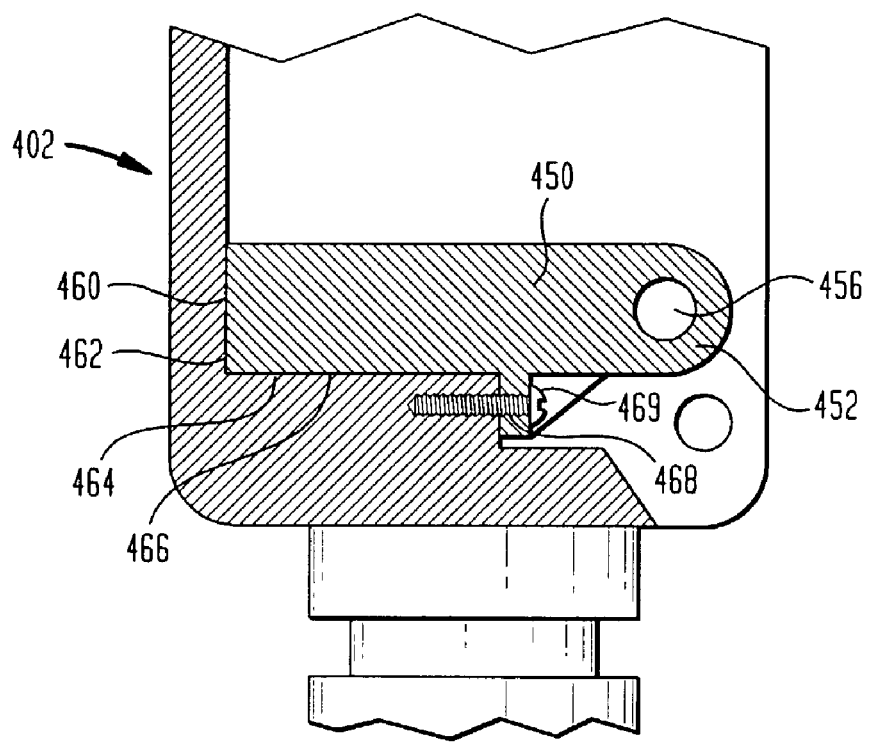
FIG. 8 is a side view in partial cross section of an end cap including a non-adjustable clevis according to the present invention.

The friction cylinder 1 is pivotally attached to a first end cap 402 and at an upper channel 404 to support the weight of the support device and its device. A clevis 450, described in detail in FIGS. 7 and 8, is attached to first end cap 402, and is adapted to receive attachment 430 to connect friction cylinder 1 to the first end cap 402. Referring now to FIG. 7, clevis 450 is depicted including at a first end of the clevis a pair of fastening members 452,454 to which are fastened through holes 456,458 attachment 430 at the second end of rod 434 of the friction cylinder 1. The clevis and attachment are fastened via pin 459 (FIG. 6) which passes through holes 456,458 and a hole (not shown) in attachment 430. A second end of clevis 450 is adapted to engage the first end cap 402 as shown in FIG. 8. A back surface 460 and bottom surface 464 of the second end of clevis 450 engage an internal back surface 462 and bottom surface 466 of first end cap 402, respectively. A pair of clevis fasteners 468 extending below and to the sides of clevis 450 serve to secure the clevis to first end cap 402 via button head screw 469.

For exemplary purposes, referring to FIG. 2, one embodiment of a rod attachment 28 is shown. The second end 24 of a shaft 20 is threaded, thereby adapted to engage a threaded bore at a first end 29 of attachment 28. A second end 27 of attachment 28 is flattened and adapted to fit, for example, between the fastening members 452,454. A hole 25 central to the second end 27 of attachment 28 is adapted to receive a pin to pivotally attach the friction cylinder within a support device.

Similarly, shown in FIG. 2 is an attachment 12 at the second end 8 of tubular member 2. In this embodiment, the attachment 12 is shown as a flat head screw welded to the tube end. The screw is adapted to engage a socket member 440 of a ball and socket joint 432 as shown in FIG. 6. Attached, and preferably welded, to a top inner wall 434 of upper arm channel 404 is a threaded mount 436 for receiving a threaded extension 438 of a ball member 439 of a ball and socket joint 432 which mates with the socket member 440. The ball and socket joint 432 also allows friction cylinder 1 to pivot vertically as the support arm moves up and down.

In addition to the embodiment of a support device described above, there are other designs for support devices which may utilize the friction cylinder of the present invention. For example, in some conventional support devices, only a single rigid elongated member is utilized, instead of having both an upper and lower channel as described above. In yet others, more than two elongated members are found. In addition, in some conventional support devices, the counterbalance mechanism, such as a gas spring, is not enclosed or hidden, either in full or in part, within the support arm. It is contemplated that the friction cylinder of the present invention may be used in association with many of these prior art devices.

FIG. 9 illustrates the vertical adjustment of a support device 400 upon which is mounted a peripheral electronic device 470, shown here as a flat screen display, where all numerals correspond to those elements previously described. The electronic device 470 is secured to a forearm extension 472 via tilting bracket 474. Tilting bracket 474 is mounted to the extension 472 at a first end. The tilter bracket 474 is operative to tilt the electronic device 470 about a vertical axis and to rotate the electronic device about a horizontal axis, further adding to the adjustability of the support device. The second end of extension 472 is adapted to receive shaft 416 whereby extension 472 may pivot horizontally about shaft 416. One tilter bracket 474 is known from U.S. application Ser. No. 09/406,530 entitled "Tilter For Positioning Electronic Devices."; and forearm extensions are known from U.S. application Ser. No. 10/061,880 entitled "Modular Mounting Arm" filed Feb. 1, 2002. The disclosures of both these applications are incorporated herein by reference.

The support device 400 is shown in an elevated position A. In this position, shaft 20 is in an extended position with respect to tubular member 2. Tension adjustment screw 420 has been rotated to exert pressure upon a friction bushing (not shown) to generate sufficient frictional resistance to maintain the support device and its supported electronic device 470 in an upper position A. When a user pushes down upon forearm extension 472, electronic device 470 or an upper portion of the support device 400 sufficient to overcome the adjusted frictional resistance, the support arm may be moved vertically to any position between upper position A and lower position B. Similarly, by lifting the support device, the support device may be moved from a lower to upper position.

It is known to be easier for an individual to exert downward force on a support device, as the individual is acting with gravitational forces applied to the weight of the device as well as the support itself, than it is for an individual to pull a support device upward. It may therefore be desirable to optionally include one or more springs to bias the friction cylinder to assist in upward movement of a support device. Referring back to FIG. 5, a conventional spring 70 may be included to bias the movement of the shaft 10. Such a spring 70 is included preferably in a first cavity within hollow tubular member 2 defined by attachment 12 and the follower bushing 30 as shown. For example, when the support device 400 of FIG. 9 is in a lower position B, the shaft 20 of friction cylinder 1 is retracted, and the spring 70 of FIG. 5 is compressed. The spring therefore is applying outward force against follower bushing 30, biasing the rod towards an extended position, resulting in less effort required by the user to raise the support device 400 and associated device 470 to an elevated position A. When the support device 400 is in the elevated position A, the shaft 20 of friction cylinder 1 is in an extended position, and the spring 70 is in a relaxed position.

In yet another embodiment of the invention (not shown) the support device may be in a reverse orientation to that shown in FIG. 9. That is, where the device is attached to a support structure from below, such as in the case of a ceiling mount or elevated wall mount, or mount beneath a desk for supporting a keyboard. In that instance, when the device is in a lower position, the shaft 20 of a friction cylinder 1 would be in an extended position, and a spring 70, connected at one end to follower bushing 30 and at the other to either tubular member 8 or attachment 12, would be in tension, pulling follower bushing 30 inward, and biasing shaft 20 to a retracted position. When the support device is raised to an elevated position, the tension of the spring is released. In this manner, a spring would assist the user in raising the support device.

In yet other embodiments of the invention, a conventional spring may be located in other positions in association with the friction cylinder to generate the same effect as that previously described with respect to spring 70. For example, a conventional spring may also be positioned in a second cavity between follower bushing 30 and friction bushing 100. In yet another embodiment, the spring may be located outside tubular member 2, between the friction bushing and attachment 28 along shaft 20.

Although this invention has been illustrated by reference to specific embodiments, it will be apparent to those skilled in the art that various changes and modifications may be made that clearly fall within the scope of the invention. The invention is intended to be protected broadly within the spirit and scope of the appended claims.

What is claimed is:

1. An adjustable support for an electronic device comprising:
   a first endcap adapted to be mounted to a support structure;
   a second endcap;
   a forearm extension having first and second ends, said first end pivotally coupled to said second endcap;
   a first elongated arm having a first and second end respectively pivotally connected to said first and second endcaps so that said arm may be vertically moved with respect to said support structure;
   a friction cylinder comprising a hollow tubular member having first and second ends, an elongated shaft having first and second ends, said shaft slidably received within said tubular member, and a friction bushing coupled to said tubular member, wherein said friction bushing is a fully-split friction bushing comprising two mating halves, each half having a mating surface, said mating surfaces having a central longitudinal groove whereby, when said mating halves are in alignment, said longitudinal grooves form a central longitudinal passage adapted to receive said shaft, whereby, when pressure is applied to said friction bushing, at least one of said mating surfaces frictionally engages said shaft along at least a portion of at least one of said grooves to retard sliding movement of said shaft within said tubular member, said second end of said shaft and said second end of said tubular member pivotally attached to one of said first endcap and said arm, whereby said friction cylinder functions as a counterbalance to the weight of an electronic device.

2. The support of claim 1, further comprising a second elongated arm, said second arm having first and second ends, said first end of said second arm pivotally attached to said first endcap, said second end of said second arm pivotally attached to said second endcap, whereby said first endcap, second endcap, first arm and second arm form an adjustable parallelogram that permits said electronic device supported thereby to be vertically adjusted to a desired height.

3. The support of claim 1, wherein when said mating halves are in alignment, said friction bushing further comprises a head portion and a body portion extending from said head portion, said body portion adapted to fit within an opening at said first end of said tubular member, said head portion having a width greater than said body portion and said opening in at least one direction such that said head portion prevents said friction bushing from moving within said tubular member.

4. An adjustable support for an electronic device comprising:
   a first endcap adapted to be mounted to a support structure;
   a second endcap;
   a forearm extension having first and second ends, said first end pivotally coupled to said second endcap;
   a first elongated arm having a first and second end respectively pivotally connected to said first and second endcaps so that said arm may be vertically moved with respect to said support structure;
   a friction cylinder comprising a hollow tubular member having first and second ends, an elongated shaft having first and second ends, said shaft slidably received within said tubular member, and a friction bushing coupled to said tubular member, wherein said friction bushing is a half-split friction bushing comprising first and second ends, and a central longitudinal groove defining a central longitudinal passage, said longitudinal passage adapted to receive said shaft, said friction bushing including a longitudinal gap extending between said ends of said friction bushing in communication with said passage, whereby, when pressure is applied to said friction bushing, said friction bushing frictionally engages said shaft along at least a portion of said groove to retard sliding movement of said shaft within said tubular member, said second end of said shaft and said second end of said tubular member pivotally attached to one of said first endcap and said arm, whereby said friction cylinder functions as a counterbalance to the weight of an electronic device.

5. The support of claim 4, wherein said friction bushing further comprises a head portion and a body portion extending from said head portion, said body portion adapted to fit within an opening at said first end of said tubular member, said head portion having a width greater than said body portion and said opening in at least one direction such that said head portion prevents said friction bushing from moving within said tubular member.

6. A method of maintaining an elevation for an electronic device comprising the steps of:
   securing a support device to a support structure, said support device comprising a first endcap secured to said support structure, a support arm having first and second ends, said first end of said support arm pivotally attached to said first endcap, a second endcap pivotally attached to said second end of said support arm, and a friction cylinder pivotally secured to said first endcap at a first end of said friction cylinder and to said support arm at a second end of said friction cylinder, wherein said friction cylinder comprises:
   a hollow tubular member having first and second ends;
   an elongated shaft having first and second ends, said shaft slidably received within said tubular member;
   a friction bushing coupled to said tubular member, wherein said friction bushing is a fully-split friction bushing comprising two mating halves, each half having a mating surface, said mating surfaces having a central longitudinal groove whereby, when said mating halves are in alignment, said longitudinal grooves form a central longitudinal passage between said mating halves, said longitudinal passage adapted to receive said shaft, allowing said shaft to extend or retract from within said tubular member; and
   a friction regulating element, said friction regulating element adapted to engage said friction bushing;
   securing an electronic device to a mounting element, said mounting element connected to said second endcap;
   adjusting a frictional resistance provided by the friction cylinder to support the weight of at least said electronic device by applying or releasing pressure upon said friction bushing using said friction regulating element, whereby, when the support arm is raised or lowered to a desired vertical position, the frictional resistance is sufficient to maintain said electronic device in said desired vertical position.

7. The method of claim 6, wherein said friction cylinder further comprises a follower bushing coupled to said shaft and disposed within said tubular member, said method further comprising assisting in the raising of said support arm by applying a compressive force to said follower bushing using a spring positioned within said tubular member in engagement with said follower bushing.

8. A method of maintaining an elevation for an electronic device comprising the steps of:

secure a support device to a support structure, said support device comprising a first endcap secured to said support structure, a support arm having first and second ends, said first end of said support arm pivotally attached to said first endcap, a second endcap pivotally attached to said second end of said support arm, and a friction cylinder pivotally secured to said first endcap at a first end of said friction cylinder and to said support arm at a second end of said friction cylinder, wherein said friction cylinder comprises a hollow tubular member having first and second ends;

an elongated shaft having first and second ends, said shaft slidably received within said tubular member;

a friction bushing coupled to said tubular member, wherein said friction bushing is a half split friction bushing comprising a central longitudinal groove defining a central longitudinal passage, said longitudinal passage adapted to receive said shaft, and whereby when pressure is applied to said friction bushing, said groove frictionally engages said shaft thereby creating resistance to retracting and extending said shaft; and a friction regulating element, said friction regulating element adapted to engage said friction bushing;

securing an electronic device to a mounting element, said mounting element connected to said second endcap;

adjusting a frictional resistance provided by the friction cylinder to support the weight of at least said electronic device by applying or releasing pressure upon said friction bushing using said friction regulating element whereby, when the support arm is raised or lowered to a desired vertical position, the frictional resistance is sufficient to maintain said electronic device in said desired vertical position.

9. The method of claim 8, wherein said friction cylinder further comprises a follower bushing coupled to said shaft and disposed within said tubular member, said method further comprising assisting in the raising of said support arm by applying a compressive force to said follower bushing using a spring positioned within said tubular member in engagement with said follower bushing.

* * * * *